ANGLE EXPLOSION BONDING

Original Filed March 11, 1963 2 Sheets-Sheet 1

INVENTOR
BRUNO CHUDZIK

BY John H. Tregoning
ATTORNEY

ZOY= δ ZOX= δ1
ZXY= ψ XOY= δ2 SOQ= γ2/2
OZR= γ1 TOR= γ1/2
QYO= γ2

INVENTOR

BRUNO CHUDZIK

BY

John H. Tregoning

ATTORNEY

United States Patent Office

Re. 26,858
Reissued Apr. 21, 1970

26,858
ANGLE EXPLOSION BONDING

Bruno Chudzik, Wenonah, N.J., assignor to E. I. du Pont de Nemours and Company, Wilmington, Del., a corporation of Delaware Original No. 3,264,731, dated Aug. 9, 1966, Ser. No. 264,373, Mar. 11, 1963, which is a continuation-in-part of application Ser. No. 118,376, June 20, 1961. Application for reissue Mar. 26, 1968, Ser. No. 719,787
Int. Cl. B23k *21/00*
U.S. Cl. 29—470.1 17 Claims

Matter enclosed in heavy brackets [ ] appears in the original patent but forms no part of this reissue specification; matter printed in italics indicates the additions made by reissue.

*ABSTRACT OF THE DISCLOSURE*

*Metal surfaces are metallurgically bonded together by arranging such surfaces at an angle to each other and explosively causing them to collide progressively under bonding conditions.*

This application is a continuation-in-part of copending application Serial No. 118,376 filed June 20, 1961 in the name of Bruno Chudzik, now abandoned.

This invention relates to a method of bonding metals. More particularly, this invention relates to a method of bonding metals by explosive means.

In accordance with the present invention there is provided a method for forming a substantially continuous metallurgical bond between metal layers which comprises forming a juncture between at least two metal layers, said juncture being defined by an angle of at least about 1°, positioning a layer of a detonating explosive on the external surface of at least one of the metal layers, and initiating the explosive so that at least one of the ratios of the collision velocities to the respective sonic velocities of the metal layers is less than 1.2 and when each of these ratios is greater than 1.0 the angle between each two adjacent metal layers in the collision region exceeds the maximum value of the sum of the deflections produced in the metal layers by oblique shock-waves.

The term "metal layer" as used herein refers to a layer of a single metal or of an alloy of two or more individual metals or to a plurality of single layers bonded together.

The term "juncture" as used herein refers to the arrangement of one metal layer with respect to the other metal layer such that the two layers meet or substantially meet at a single point or along a single line. In either case, the planes in which the internal surfaces (i.e., the surfaces to be bonded) of the two metal layers lie, intersect along a given line, i.e., the two layers are not parallel. Hereinafter, the planes in which the internal surfaces of the metal layers lie are designated simply as "the planes of the two metal layers."

The expression "said juncture being defined by an angle of at least about 1°" as used herein means that an angle, $\delta$, between the two metal layers measured in any plane perpendicular to the line of intersection of the planes of the two metal layers is at least about 1°.

The term "external surface" of a metal layer as used herein refers to that surface of the metal layer parallel to the inner surface to be bonded of the metal layer.

Reference is now made to the attached drawings for a more complete understanding of the invention. In the drawings like numbers indicate similar elements and FIGURE 1 is a cross-sectional view of an assembly which may be used to practice the invention in which a layer of a detonating explosive is positioned on the external surface of one of the metal layers;

Figure 1:
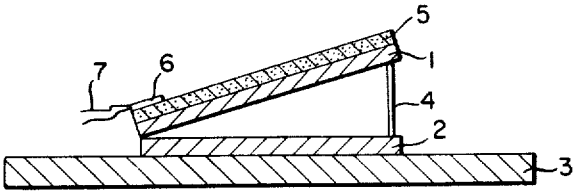

In FIGURE 1, metal layer 1 forms a juncture with metal layer 2 which rests on a supporting means 3, e.g., of metal, wood, or gypsum cement, the angle between metal layers 1 and 2 being maintained by means of a spacer bar 4. A layer of a detonating explosive 5 to which is attached an initiator 6 having lead wires 7 to a source of electric current is positioned on the external surface of metal layer 1.

Figure 2:
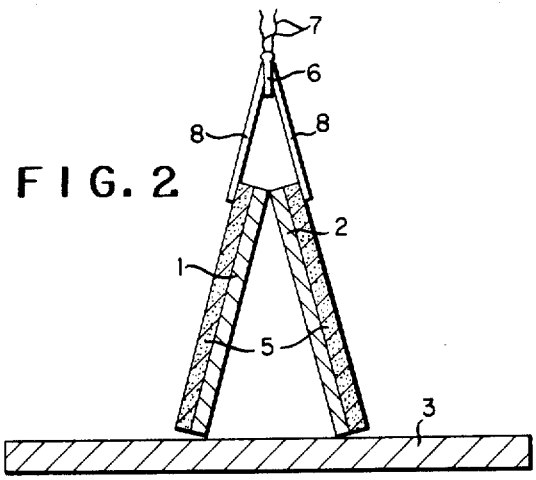
FIGURE 2 is a cross-sectional view of another assembly which may be used to practice the invention in which a layer of a detonating explosive is positioned on the external surface of each of the metal layers.

In FIGURE 2, metal layers 1 and 2 rest on supporting means 3. A layer of a detonating explosive 5 to which is attached an explosive cord 8 is positioned on the external surface of each of the metal layers and the explosive cords 8 are attached to an initiator 6 having lead wires 7 to a source of electric current.

Although it is not intended that the invention be limited by any theory of operation a discussion of the mechanism by which bonding is achieved elucidates the extent to which process conditions can be varied or modified within the sense and scope of the invention and facilitates selection of optimum conditions for bonding in a given system.

Figure 3:
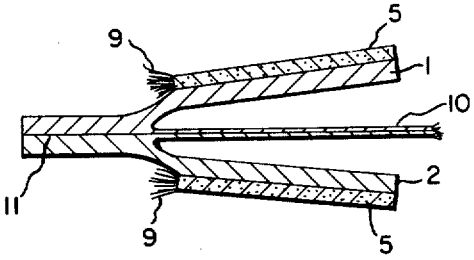
FIGURE 3 is a cross-sectional view of a bonding assembly during the course of detonation of explosive layers positioned on the external surfaces of each of the metal layers.
Figure 4A:
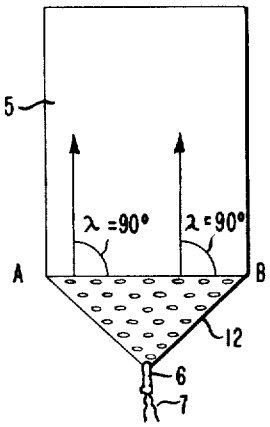
FIGURES 4A to 4E are top views of bonding assemblies in each of which an explosive layer is to be initiated at a single point or along a single line on the explosive layer.
Figure 4B:
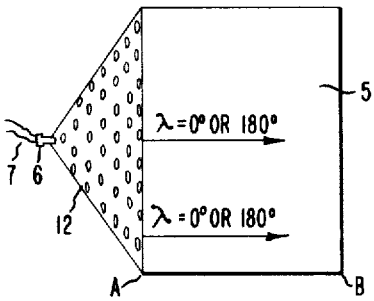
Figure 4C:
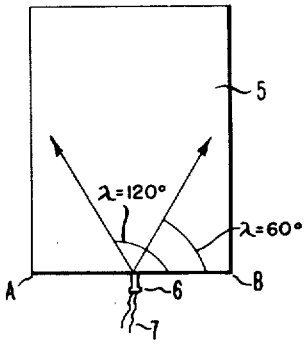
Figure 4D:
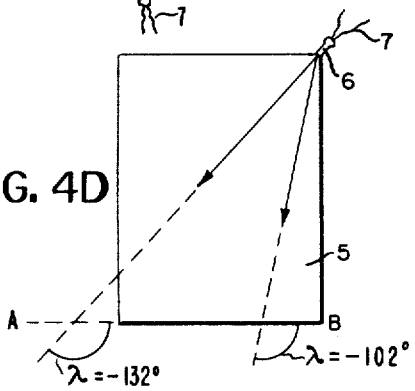
Figure 4E:
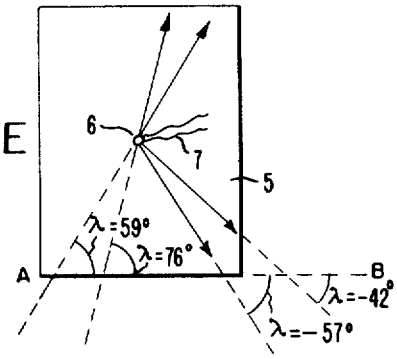

It is believed that the formation of a continuous metallurgical bond between the adjacent surfaces of two metal layers or plates is dependent upon a "jetting" phenomenon which occurs as illustrated schematically in FIGURE 3. When the layer(s) of explosive 5 is initiated (9 representing the gaseous detonation products) the pressure produced by the detonation propels the metal plate(s) upon which the explosive rests toward the adjacent metal plate. When the metal plates collide at an appropriate angle and the collision region progresses across the metal plates at an appropriate velocity the pressure produced by the collision is transmitted slightly ahead of the collision region and forces the surface layers of the opposing metal plates to be thrown forward at high velocity from the collision region, i.e., to form a jet 10. The removal of the surface oxides and other contaminants by the jet allows the underlying "clean" metal of the two opposing plates to be brought into intimate contact thus forming a continuous metallurgical bond 11 at the common interface between the two plates. In some instances, the jet escapes completely from between the two plates removing the surface oxides and other surface contaminants from the bonded system. In other instances, the jetted material is trapped between the two plates. In the latter cases the high kinetic energy of the jet causes melting of the adjacent clean surfaces of the metal plates and the melted material rapidly solidifies providing a bonding zone characterized by the presence of a homogeneous mixture of the metals of the two opposing plates which bonding zone contains the surface contaminants in a dispersed state so that they do not hinder bonding.

The bonding zone can comprise a uniform layer of the homogeneous mixture of the metals of the two opposing plates or, if the trapped jet oscillates as it moves ahead of the collision region, the bonding zone may contain only discrete pockets of the mixture at more or less periodic intervals across the interface between the plates. In any event, a sound, substantially continuous metallurgical bond is produced.

Since the appropriate collision angle and velocity required for jetting vary from system to system it is necessary to explain, first, how this angle and velocity can be determined for a given system, and, second, how the process conditions can be adjusted to insure collision of a given pair of metal plates at the required angle and velocity.

In the following discussion 1 and 2 refer to the two colliding metal plates. $V_{C1}$ and $V_{C2}$ denote the velocities of the collision region relative to plates 1 and 2 respectively, or the velocities with which the two plates move into the collision region; $C_1$ and $C_2$ represent the bulk sound velocities of plates 1 and 2, respectively, bulk sound velocity being defined as the velocity of a plastic shock wave which forms when an applied stress just exceeds the elastic limit for unidimensional compression of the particular metal or metallic system involved; $V_P$ is the relative plate velocity or the velocity with which the plates approach one another and $\psi$ is the angle between plates 1 and 2 in the collision region. It is assumed that the values of $V_{C1}$, $V_{C2}$, and $\psi$ which describe the collision are changing slowly enough as the collosion proceeds that the flow of metal in the collision region at any instant may be described approximately as a locally steady flow.

When either $V_{C1}$ is less than $C_1$ and/or $C_{C2}$ is less than $C_2$, bonding is achieved as long as $V_P$ exceeds a minimum value required to produce sufficient pressure in the collision region to overcome the elastic strength or exceed the elastic limit of at least one of the metal plates and thus provide the plastic deformation required for jetting. The minimum relative plate velocity for any particular metal system depends on the properties of the metal plates and increases with increasing strength, hardness, and surface roughness. This minimum value of $V_P$ necessary for bonding stainless steel to carbon steel, for example, is about 90 meters per second if the surfaces of the metal plates are fairly smooth.

When both $V_{C1}$ exceeds $C_1$ and $V_{C2}$ exceeds $C_2$, collision results in the formation of oblique shock waves in both plates. If these shock waves are attached to the collision line, the pressure produced by the collision cannot be transmitted ahead of the shock waves, i.e., cannot be transmitted ahead of the collision region, and, therefore, a jet cannot be formed. Instead, the oblique attached shock waves sharply deflect the metal plates, leaving the surface contaminants at the interface and thus preventing bonding. The shock waves are reflected from the external free surfaces of the colliding plates as rarefaction waves which either cause the plates to separate at high velocity or produce spalling in one of the plates. If, however, $V_P$ exceeds a minimum value required to make the collision angle $\psi$ exceed a critical value, $\Phi_C$, the oblique shock waves become detached from the collision region and stand ahead of the collision line. In this situation pressure is transmitted ahead of the collision region causing jet formation and making bonding possible. The value of this critical angle differs from system to system and is dependent upon $V_{C1}$ and $V_{C2}$, and upon the material properties of metal plates 1 and 2.

When both $V_{C1}$ exceeds 1.2 $C_1$ and $V_{C2}$ exceeds 1.2 $C_2$ good bonding is not obtained even when jetting occurs. Under these conditions an extremely high relative plate velocity, $V_P$, is required in order to satisfy the condition for jetting, i.e., to make $\psi$ exceed $\Phi_C$. The excessive explosive load needed to produce this high plate velocity often causes gross deformation of the bonding assembly.

Furthermore, the strong detached shock waves which are reflected from the external free surfaces of the colliding plates as rarefaction waves cause disruption of any transient bond that is formed and contribute to the severe deformation and fracturing of the plates.

From the preceeding discussion it is obvious that the values which must be determined before process conditions can be adjusted to insure jetting and, therefore, bonding, are the sonic velocities of metal plates 1 and 2, the velocities with which the plates move into the collision region, and the relative plate velocity. In addition, if the velocities with which the plates move into the collsion region exceed the respective sonic velocities of the plates, the angle at which plates 1 and 2 collide and the critical collision angle which must be exceeded in order to insure jetting must be determined.

The value of the sonic velocity, C, of a metal or metallic system may be obtained by means of the relation $$C=\sqrt{K/\rho} \quad (1)$$

where K is the adiabatic bulk modulus in dynes/cm.$^2$ and $\rho$ is the density in grams/cm.$^3$. Values of K may be obtained from values of Young's modulus, E, and Poisson's ratio, $\nu$, by means of the relation $$K=E/(1-2\nu) \quad (2)$$

Values of $\rho$ and K or E and $\nu$ are readily available in the literature (see, for example, American Institute of Physics Handbook, McGraw-Hill, New York, 1957).

Alternatively, the sonic velocity may be ascertained from published values of the velocity of the plastic shock wave as a function of the particle velocity imparted to the metal by the shock wave in the manner described by R. G. McQueen and S. P. Marsh, Journal of Applied Physics 31 (7), 1253 (1960).

If literature data are unavailable, values of C may be obtained by carrying out shock wave measurements as described by R. G. McQueen and S. P. Marsh (loc. cit.) and in references cited by them. Alternatively C may be ascertained from the relation $$C=\sqrt{C_L^2-(4/3)C_S^2} \quad (3)$$

where $C_L$ is the velocity of the elastic compressional waves and $C_S$ is the velocity of elastic shear waves in the metal. The required velocities of the elastic shear waves may be measured by well known methods. For illustrative purposes, sonic velocity values for representative metals are given in the following table.

| Metal: | Sonic velocity, meters/sec. |
|---|---|
| Zinc | 3000 |
| Copper | 4000 |
| Magnesium | 4500 |
| Niobium | 4500 |
| Austenitic stainless steel | 4500 |
| Nickel | 4700 |
| Titanium | 4800 |
| Iron | 4800 |
| Molybdenum | 5200 |
| Aluminium | 5500 |

The methods for determining $V_{C1}$, $V_{C2}$, $V_P$, and $\psi$ are most easily understood in the light of a discussion of the dynamics and geometry of a few modifications of the novel process for explosively bonding metal layers.

Consider, for example, assemblies in which metal layers 1 and 2 are positioned so that a juncture in the sense defined above is formed between the two plates and a layer of explosive is positioned on the external surface of one of both plates. When the explosive layer or layers are initiated the pressures produced by the detonations rapidly accelerate the adjacent metal plate or plates to high velocities. Usually the maximum velocity for a given plate is reached in a distance equal to the thickness of the plate and velocities high enough to satisfy the conditions for bonding are attained in distances equal to only fractions of the thickness of the plate. If each explosive layer is uniform in thickness and other physical properties and if each layer is initiated simultaneously over its entire surface, e.g., using a plane wave generator, the adjacent metal plate moves in a direction essentially perpendicular to its original plane position and collides with the other metal plate at an angle, $\psi$, which is equal to the original angle, $\delta$, between the plates.

In the first case in which a layer of explosive positioned on the external surface of, for example, metal plate 1, is initiated simultaneously over its entire surface, metal plate 1 moves at a velocity, $V_{P1}$, which is equal to the relative plate velocity, $V_P$, and collides with metal plate 2. In this first case, $V_{C1}$ and $V_{C2}$ are determined solely by the initial angle, $\delta$, between the metal plates and the relative plate veloctity, $V_P$, and may be calculated by means of the relations (4) $$V_{C1}=V_P/\tan\delta \text{ and}$$

(5) $$V_{C2}=V_P/\sin\delta$$

In the second case in which layers of explosive positioned on the external surfaces of metal plates 1 and 2 are both initiated simultaneously over their entire surfaces, metal plate 1 moves at a velocity, $V_{P1}$, and metal plate 2 moves at a velocity, $V_{P2}$. The relative plate velocity, $V_P$, is equal to the vector sum of $V_{P1}$ and $V_{P2}$ and may be calculated by means of the relation (6) $$V_P=\sqrt{V_P^2+V_{P2}^2+2V_{P1}V_{P2}\cos\delta}$$

The metal plates collide along a plane which makes angles of $\delta_1$ and $\delta_2$ with the original planes of metal plates 1 and 2, respectively. These angles, like the original angle, $\delta$, between the metal plates, are measured in any plane perpendicular to the line of intersection between the original planes of the metal plates and may be calculated by means of the relations (7) $$\cos\delta_1=\frac{V_{P2}+V_{P1}\cos\delta}{V_P}$$

and (8) $$\cos\delta_2=\frac{V_{P1}+V_{P2}\cos\delta}{V_P}$$

In this second case $V_{C1}$ and $V_{C2}$ are determined solely by the initial angle, $\delta$, between the metal plates, the plate velocities, $V_{P1}$ and $V_{P2}$, and the relative plate velocity, $V_P$, and may be calculated by means of the relations (9)

$$V_{C1}=\frac{V_{P1}}{\tan\delta_1}=V_{P1}\cot\text{anticos}\left(\frac{V_{P2}+V_{P1}\cos\delta}{V_P}\right)$$

and (10)

$$V_{C2}=\frac{V_{P2}}{\tan\delta_2}=V_{P2}\cot\text{anticos}\left(\frac{V_{P1}+V_{P2}\cos\delta}{V_P}\right)$$

In either the first or the second case the angle, $\delta$ or $\psi$, is, of course, known and the plate velocities, $V_{P1}$ and $V_{P2}$ may be determined experimentally by any of several methods well known to the art. One such method for determining the velocity of an explosively propelled metal plate involves the use of electrical contact pins and is described by D. Bancroft et al., Journal of Applied Physics 27 (3), 291 (1956). An optical method is described by W. A. Allen, ibid. 24 (9), 1180 (1953), and a method involving the use of flash X-radiographs is described by A. S. Balchan, ibid. 34 (2), 241 (1963). In the first case $V_{C1}$ and $V_{C2}$ can be calculated directly from the experimentally measured $V_{P1}(=V_P)$. In the second case $V_P$ must first be calculated from the experimentally measured $V_{P1}$ and $V_{P2}$ by means of relation (6).

If $V_{C1}$ and/or $V_{C2}$ are smaller than the respective sonic velocities of metal plates 1 and 2 in order to insure bonding it is merely necessary to determine the minimum relative plate velocity, $V_P$, necessary to overcome the elastic strength of at least one of the metal plates. Since the relative plate velocity increases with increasing loading of a given explosive and with decreasing thickness and density of the explosively propelled metal plate(s) this minimum relative plate velocity can be determined experimentally by adjusting the explosive loading and plate thickness and density until some value of $V_P$ at which jetting consistently occurs without accompanying gross deformation of the metal plates is found.

If, however, $V_{C1}$ and $V_{C2}$ exceed the respective sonic velocities of the metal plates, oblique shock waves are formed in the plates and $\Phi_C$ must be determined before process conditions can be controlled so that $\psi$ exceeds $\Phi_C$ thus meeting the condition necessary to insure detachment of the shock waves from the collision line and permit jetting.

When the oblique shock waves are attached to the collision line they sharply deflect the metal plates by the angles $\phi_1$ and $\phi_2$, respectively, and the angle between the plates in the collision region, $\psi$, is equal to the sum of these deflections which sum is designated as $\Phi$ (i.e., $\psi=\phi_1+\phi_2=\Phi$). The value of $\Phi$ for a given system is dependent upon $V_{C1}$ and $V_{C2}$ and upon the material properties of the metal plates and it is the maximum value of $\Phi$ for the given system which is equal to $\Phi_C$ and which $\psi$ must exceed to permit jetting.

The deflection angles $\phi_1$ and $\phi_2$ may be calculated from the properties of oblique shock waves in metal plates by means of the relations

(11) $$\tan\phi_1=\frac{U_M(V_{C1}^2-U_S^2)^{1/2}}{V_{C1}^2-U_MU_S} \text{ and}$$

(12) $$\tan\phi_2=\frac{U_M(V_{C2}^2-U_S^2)^{1/2}}{V_{C2}^2-U_MU_S}$$

in which $U_S$ is the velocity of the shock wave measured normal to the shock front and $U_M$ is the change in the velocity of the material caused by the shock wave.

The velocities, $U_S$ and $U_M$, are related to the pressures and densities ahead of and behind the shock fronts in the metal plates by the mechanical shock equations

(13) $$\rho_0U_S=\rho(U_S-U_M)$$

and

(14) $$P-P_0=\rho_0U_SU_M$$

in which $\rho_0$ and $P_0$ and $\rho$ and P are the densities and pressures ahead of and behind the shock fronts in the metal plates. The density ahead of the shock front, $\rho_0$, is simply the known density of the metal plate at ambient pressure and temperature and the pressure ahead of the shock front, $P_0$, is simply ambient pressure. Since the ambient pressure is generally around 1 atmosphere it is negligible compared to the pressure behind the shock front, P, and the second relation (14) becomes

(15) $$P=\rho_0U_SU_M$$

A considerable body of published data is available, usually in the form of Hugoniot curves, which give the relationship between P and $V(=1/\rho)$ behind shock fronts in many metals. Thus by substituting a number of values of P and $V(=1/\rho)$ in the mechanical shock equations a number of values of $U_S$ and $U_M$ for each of the metal plates are obtained. Alternatively $U_S$ and $U_M$ may be measured experimentally as described by Walsh, J. M., Rice, M. H., McQueen, R. G., and Yarger, F. L., Physical Review 108 (2), 196 (1957), and the corresponding values of P and $\rho$, calculated using the mechanical shock equations.

The values of $U_S$ and $U_M$ and the values of $V_{C1}$ and $V_{C2}$ are substituted in the equations for $\tan\phi_1$ and $\tan\phi_2$, respectively, and a number of values of $\phi_1$ and $\phi_2$ are obtained. The values of $\phi_1$ and $\phi_2$ at each of a number of given pressures are added together to give a number of values of $\Phi$. Finally, the values of $\Phi$ are plotted against the corresponding pressures and the resulting curve goes through a maximum. It is this maximum value of $\Phi$ which is equal to $\Phi_C$ and which $\psi$ must exceed in order to insure detachment of the shock waves from the collision line and thus to insure jetting. Since $\psi$ is equal to $\delta$, $\psi$ can be changed by changing the initial angle between the metal plates.

If an explosive layer is initiated at a single point or along a line, instead of with a plane wave generator, detonation progresses across the explosive layer at the detonation velocity, D, of the explosive in a direction essentially parallel to the original plane position of the adjacent metal plate 1 or 2. Thus the pressure produced by the detonation acts progressively on the adjacent metal plate 1 or 2 to propel it toward the other metal plate, i.e., the pressure acts first on those portions of the adjacent plate which are closest to the point or line of initiation. Under these conditions adjacent metal plate 1 or 2 is deflected by an angle $\gamma_1$ or $\gamma_2$ and travels at a velocity $Vp_1$ or $Vp_2$ in a direction which forms an angle of $$\frac{\gamma_1}{2}$$

or $$\frac{\gamma_2}{2}$$

with the perpendicular to the original plane position of the plate.

The angle, $\delta$, as defined above is an angle between metal plates 1 and 2 in any plane perpendicular to the line of intersection of the planes of the two plates. This angle simply defines the initial arrangement of the plates and is independent of the method of initiation and the consequent pattern of propagation of detonation of an explosive layer placed on the external surface of metal plate 1 or 2. There is however an angle, $\lambda$, which for a given arrangement of the plates at an initial angle, $\delta$, can vary in a manner dependent upon the direction in which detonation progresses across an explosive layer. Properly speaking, there are two such angles: $\lambda_1$ which is the angle between the initial line of intersection of the planes of the metal plates and any line on metal plate 1 along which detonation is propagating and $\lambda_2$ which is the angle between the initial line of intersection of the planes of the metal plates and any line on metal plate 2 along which detonation is propagating. However, for practical reasons which are discussed in greater detail hereinafter, when explosive layers are positioned on the external surfaces of both metal plate 1 and metal plate 2, both layers have substantially the same detonation velocity and are initiated in substantially the same manner, i.e., the patterns of propagation of explosive layers placed on metal plates 1 and 2 are substantially the same and $\lambda_1=\lambda_2=\lambda$.

Figure 5:
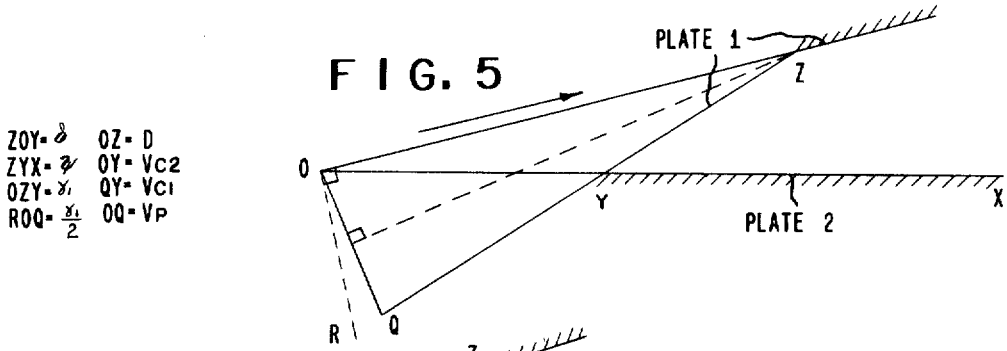
FIGURE 5 is a cross-sectional diagram illustrating the geometry and dynamics of a bonding assembly having an explosive layer on one metal plate.
Figure 6:
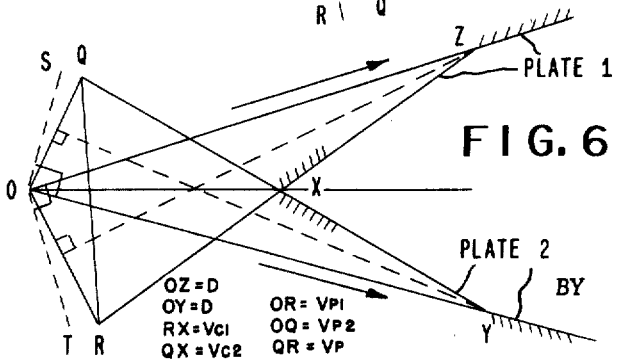
FIGURE 6 is a cross-sectional diagram illustrating the geometry and dynamics of a bonding assembly having an explosive layer on both metal planes.

The direction of the initial line of intersection between the planes of the metal plates is defined so that when detonation is proceeding away from the line of intersection the angle $\lambda$, is generated by rotating the line of intersection counterclockwise until it coincides with the line of detonation and $\lambda$ is positive and between 0 and $\pi$ or 0° and 180°. Conversely, when detonation is proceeding toward the line of intersection, the angle $\lambda$, is generated by rotating the line of intersection clockwise until it coincides with the line of detonation; $\lambda$ is negative and between 0 and $-\pi$ or 0° and −180°. Obviously, when detonation is proceeding parallel to the line of intersection there is no angle between the two lines, i.e., $\lambda=0$ or $\pi$. FIGURES 4A to 4E illustrate the values of $\lambda$ at various locations on the surface of the bonding assembly when the explosive layer 5 is initiated at a point, e.g., by means of an initiator 6 having lead wires 7 to a source of electric current or along a line, e.g., by means of a line wave generator 12. In each of these drawings the line AB approximates the line of intersection of the planes of the metal plates, the solid lines marked with arrows indicate the directions or the lines along which detonation propagates when the explosive layer is initiated as shown in the drawing, and the broken lines are extrapolations of the lines along which detonation propagates. The geometrical relationships among $V_{C1}$, $V_{C2}$, D, $V_P$, $\delta$, $\psi$, and $\gamma_1$ when an explosive layer positioned on the external surface of metal plate 1 is initiated so that $\lambda=90°$ are illustrated in FIGURE 5. The geometrical relationships among $C_{C1}$,$V_{C2}$ D, $V_{P1}$, $V_{P2}$, $V_P$, $\delta$, $\delta_1$, $\delta_2$, $\psi$, $\gamma_1$ and $\gamma_2$ when explosive layers positioned on the external surfaces of metal plates 1 and 2 are initiated simultaneously so that $\lambda=90°$ are illustrated in FIGURE 6.

When the explosive layer(s) is initiated at a point or along a line it is necessary, just as it is necessary when a plane wave generator is used, to determine the values of $V_{C1}$ and $V_{C2}$ for a given system. However, when a single explosive layer positioned on the external surface of, for example, metal plate 1 is initiated at a point or along a line, $V_{C1}$ and $V_{C2}$ depend on $\delta$, $\gamma_1$, $\lambda$, and D and when explosive layers positioned on the external surfaces of both metal plates are initiated simultaneously at a point or along a line on each layer, $V_{C1}$ depends on $\delta_1$, $\gamma_1$, $\lambda$, and D and $V_{C2}$ depends on $\delta_2$, $\gamma_2$, $\lambda$, and D.

Considering the first case, i.e., a single explosive layer, the angle, $\delta$, is known and the angle, $\lambda$, is readily determined since the pattern of propagation of detonation of an explosive layer initiated at any point or line on the layer is obvious to one skilled in the art. The angle of deflection of metal plate 1, $\gamma_1$, can be measured by any of the experimental methods given above for measuring $V_{P1}$, or $\gamma_1$ can be calculated from the known detonation velocity, D, and the experimentally determined plate velocity, $V_{P1}$, by means of the relation $$V_{P1}=2D\sin\frac{\gamma_1}{2}\left(\text{or } V_{P2}=2D\sin\frac{\gamma_2}{2}\right) \tag{16}$$

The collision velocities of plates 1 and 2 are obtained by substituting the values of $\delta$, $\lambda$, $\gamma_1$, and D, determined as indicated in the preceding paragraph, in the following equations and solving the equations for $V_{C1}$ and $V_{C2}$.

$$\frac{V_{C1}}{D}=\frac{\sin\text{antitan}}{\cos\lambda}\left(\frac{\left[1-\tan\frac{\gamma_1}{2}\tan\delta\sin\lambda\right]\sin\gamma_1\sin\lambda\cos\lambda}{\sin\gamma_1+\cos\gamma_1\tan\delta\sin\lambda-\left[1-\tan\frac{\gamma_1}{2}\tan\delta\sin\lambda\right]\sin\gamma_1\cos^2\lambda}\right) \tag{17}$$

$$\frac{V_{C2}}{D}=\frac{\sin\text{antitan}}{\cos\lambda}\left(\frac{\sin\lambda\cos\lambda}{\cos\delta\,[1+\cot\gamma_1\tan\delta\sin\lambda-\cos^2\lambda]}\right) \tag{18}$$

These equations are simplified when as is often convenient, the explosive layer is initiated simultaneously along an entire edge of the layer, e.g., by means of a line wave generator attached to one edge of the layer. When this edge is parallel to or coextensive with the line of intersection of the planes of the metal plates detonation proceeds in a direction normal to the line of intersection over the entire surface of the layer, i.e., $\lambda=90°$ (see FIGURE 4A) and the equations for $V_{C1}$ and $V_{C2}$ are reduced to the following forms.

(19)
$$\frac{V_{C1}}{D}=\frac{\sin\gamma_1}{\sin(\gamma_1+\delta)}\cdot\frac{\cos\left(\frac{\gamma_1}{2}+\delta\right)}{\cos\frac{\gamma_1}{2}}$$

(20)
$$\frac{V_{C2}}{D}=\frac{\sin\gamma_1}{\sin(\gamma_1+\delta)}$$

When this edge is perpendicular to the line of intersection detonation proceeds in a direction parallel to the line of intersection over the entire surface of the layer, i.e., $\lambda=0°$ or $180°$ (see FIGURE 4B) and the equations are reduced to the following forms.

(21)
$$\frac{V_{C1}}{D}=\frac{\sin\gamma_1}{(\sin^2\gamma_1+\tan^2\delta)^{1/2}}$$

(22)
$$\frac{V_{C2}}{D}=\frac{\tan\gamma_1}{(\tan^2\gamma^1+\sin^2\delta)^{1/2}}$$

Considering the second case, i.e., an explosive layer positioned on the external surfaces of both metal plates, D is known; the angles, $\lambda$, $\gamma_1$ and $\gamma_2$, can be determined as indicated in the preceding paragraph; and the angles, $\delta_1$ and $\delta_2$ are the solutions of the two equations

(23)
$$\delta_1+\delta_2=\delta$$

and

(24)
$$\cos\delta_1(1+\cot\gamma_1\tan\delta_1\sin\lambda-\cos^2\lambda)=\cos\delta_2(1+\cot\gamma^2\tan\delta_2\sin\lambda-\cos^2\lambda)$$

Knowing $\delta_1$, $\delta_2$, $\gamma_1$, $\gamma_2$, $\lambda$, and D, $V_{C1}$ and $V_{C2}$ can be calculated by means of the relations

(25)
$$\frac{V_{C1}}{D}=\frac{\sin\,\text{antitan}}{\cos\lambda}\left[\frac{\left(1-\tan\frac{\gamma_1}{2}\tan\delta_1\sin\lambda\right)\sin\gamma_1\sin\lambda\cos\lambda}{\sin\gamma_2+\cos\gamma_1\tan\delta_1\sin\lambda-(1-\tan\gamma_{1/2}\tan\delta_1\sin\lambda)\sin\gamma_1\cos^2\lambda}\right]$$

and

(26)
$$\frac{V_{C2}}{D}=\frac{\sin\,\text{antitan}}{\cos\lambda}\left[\frac{\left(1-\tan\frac{\gamma_1}{2}\tan\delta_2\sin\lambda\right)\sin\gamma_2\sin\lambda\cos\lambda}{\sin\gamma_2+\cos\gamma_2\tan\delta_2\sin\lambda-\left(1-\tan\frac{\gamma_2}{2}\tan\delta_2\sin\lambda\right)\sin\gamma_2\cos^2\lambda}\right]$$

Having determined $V_{C1}$ and $V_{C2}$, either the first or second case if $V_{C1}$ and/or $V_{C2}$ are smaller than the respective sonic velocities of metal plates 1 and 2 bonding is achieved as long as $V_P$ exceeds a minimum value necessary to overcome the elastic strength of at least one of the plate. In the first case $V_P=V_{P1}$ and the minimum value of $V_P$ may be determined and $V_P$, changed as described above with reference to plane wave initiation of a single explosive layer positioned on the external surface of metal plate 1. In the second case $V_P$ is a function of $V_{P1}$ and $V_{P2}$ which may be calculated by means of the relation

(27)
$$V_P=\sqrt{V_{P1}^2+V_{P2}^2+2V_{P1}V_{P2}\cos\left[\frac{\gamma_1+\gamma_2}{2}+\text{antitan}(\tan\delta\sin\lambda)\right]}$$

The minimum values of $V_{P1}$ and $V_{P2}$ required to give a value of $V_P$ which exceeds a minimum value necessary to overcome the elastic limit of at least one of the plates may be determined and $V_{P1}$ and $V_{P2}$ may be changed as described above with reference to plane wave initiation of a single explosive layer. If, in either the first or second case, $V_{C1}$ and $V_{C2}$ exceed respective sonic velocities of metal plates 1 and 2, $\Phi_C$ must be determined as described above and $\psi$, adjusted so that it exceeds the calculated value of $\Phi_C$. While $\psi$ is equal to $\delta$ when plane wave initiation of the explosive layer is employed, when the explosive is initiated at a point or along a line the collision angle $\psi$ may be determined by means of the relation

(28)
$$\cos\psi=\frac{V_{C1}^2+V_{C2}^2-V_P}{2V_{C1}V_{C2}}$$

and may be increased by increasing $V_P$ by adjusting process conditions as described above.

The process of the invention is applicable to bonding a wide variety of metals, such as steel, copper, aluminum, iron, titanium, niobium, chromium, cobalt, nickel, beryllium, magnesium, molybdenum, tungsten, copper, gold, and their alloys, and other metals, many of which are very difficult to bond by any of the conventional techniques. As stated previously, each of the metal layers may be a single metal, an alloy of two or more individual metals, or a composite of two or more single layers. The only limitation on the physical properties of the metal layers is that they be ductile, i.e., that they withstand permanent deformation without fracturing under an explosive load. The surfaces of the metal layers do not require any preparation to remove surface impurities prior to being subjected to the bonding procedure. However, if desired, the surfaces may be subjected to a degreasing and/or a mild abrasive treatment.

The metal layers can be of any desired dimensions and need not be flat plates of uniform thickness. For example, either or both of the layers can be wedge-shaped, i.e., of graduated thickness, curved, dished, or bent at some angle. Moreover, more than 2 metal layers can be bonded together in a single operation, for example by providing an interleaf between two outer layers to be bonded. One or more of the metal layers may be a portion of the surface of a unit of equipment to which a coating layer is to be affixed.

Many arrangements of the metal layers to be bonded may be used in the practice of the present invention. The metal layers may actually meet to form a juncture along a line or at some point such as a corner on the internal surface of each of the layers. Alternatively the metal layers may be spaced a small distance from one another at the point or line on each of the layers which is closest to the line of intersection of the planes of the layers. However, since jetting does not occur unless the layers achieve some minimum velocity, $V_P$, relative to one another before colliding, when the former arrangement is used a small region adjacent to the line or point of contact between the metal layers remains unbonded in an otherwise continuously metallurgically bonded system.

The angle, $\delta$, which defines the juncture between the metal layers to be bonded need not be constant over the entire area of each of the layers. For example, when the internal surface of one or both of the metal layers is curved or dished, $\delta$ is the angle between the plane tangent to the internal surface of the layer at a given point on the layer and the plane of the internal surface of the metal layer to which it is to be bonded, $\delta$ being measured in any plane perpendicular to the line of intersection of these two planes. When more than 2 metal layers are to be bonded together in a single operation the angle, $\delta$, between any two adjacent layers may be the same as or different from the angle, $\delta$, between any other two adjacent layers.

The method employed to maintain the angle, $\delta$, between the metal layers prior to initiation of the explosive is not critical. The angle may be formed, for example, by resting one edge of a first metal layer against a corresponding edge of a second metal layer so that the metal layers are in a "standing" position on any supporting surface as shown in FIGURE 2. Alternatively, a supporting means, e.g., spacer bars or struts as shown in FIGURE 1, may be used to maintain $\delta$ providing that the supporting means do not interfere with the bonding procedure, i.e., by shielding large areas of the surface to be bonded or retarding the acceleration of the metal layer(s) upon initiation of the explosive layer(s). In cases where the metal layers to be bonded comprise overlapping ends of the same or of two different metal sheets, e.g., in seaming pipes or plates, $\delta$ may be provided by bending one overlapping end away from the opposing overlapping end. Rigid supporting means for the entire assembly to be bonded such as are shown as 3 in FIGURES 1 and 2 are not necessary and the entire assembly may, for example, be immersed in water.

The composition of the explosive layer(s) is not critical. For example, a layer of any cast, granular, gelatinous, flexible or fibrous explosive composition based on pentaerythritol tetranitrate, cyclotrimethylenetrinitramine, trinitrotoluene, or ammonium nitrate, or mixtures thereof with each other with other explosive or nonexplosive components may be used in the process of the present invention.

An explosive layer may be positioned on the external surface of one or both metal layers and may be held in position by any suitable means such as tape, glue, etc. Obviously when more than two metal layers are bonded together in a single operation to form a single bonded composite the explosive layer is placed only on the external surface of one or both of the outer metal layers.

Alternatively, an assembly of metal layers to be bonded may be placed on each of the two opposite surfaces of a single explosive layer, thus permitting two bonded composites to be formed simultaneously. In this latter case when a single layer of explosive is used, the collision of the outer metal layer upon which the explosive is placed with an interleaf metal layer is considered to be a collision between a moving metal layer and a substantially stationary metal layer and the collision of the composite comprising this first metal layer and the interleaf with other outer metal layer is considered to be a second collision of substantially the same type. When two layers of explosive are used, the collisions of both outer metal layers with the respective adjacent surfaces of an interleaf metal layer are considered to be collisions between a moving metal layer and a substantially stationary metal layer.

One limitation which must be made on the initial angle which defines the juncture between the metal layers and on the loading, detonation velocity, and method of initiation of the explosive layer(s) used is that they be adjusted so that the two critical requirements for bonding be met.

As is apparent from the preceding discussion of the mechanism by which bonding occurs, one critical requirement for bonding is that the ratio of the collision velocity to the sonic velocity of at least one of the metal layers be less than 1.2, i.e.

$$\frac{V_{C1}}{C_1}<1.2 \text{ and/or } \frac{V_{C2}}{C_2}<1.2$$

The second critical requirement for bonding, which must be considered only if the ratios of the collision velocities of both metal layers to the respective sonic velocities of the layers are greater than 1 is that the angle between the metal layers in the collision region exceed some critical value, i.e.

when $$\frac{V_{C1}}{C_1}>1 \text{ and } \frac{V_{C2}}{C_2}>1$$

then $$\psi>\Phi c$$

Since the sonic velocity of a given metal layer must be considered to have a known fixed value it is the collision velocity which must be controlled by a suitable adjustment of process conditions in order to meet the first critical requirement for bonding.

When a layer of explosive on the external surface of one or both metal layers is initiated simultaneously over its entire surface the collision velocities of the metal layers are functions of the initial angle, $\delta$, between the layers and the velocities $V_{P1}$ and/or $V_{P2}$ at which the metal layers are propelled toward one another (see relations (4) and (5), and (9) and (10)). Thus the initial angle between the metal layers and the explosive loading must be adjusted so that the ratios $V_{C1}/C_1$ and/or $V_{C2}/C_2$ are less than 1.2.

When a layer of explosive on the external surface of one or both metal layers is initiated at a point or along a line the collision velocities of the metal layers are functions of the initial range, $\delta$, between the metal layers, the angle, $\gamma_1$ and/or $\gamma_2$, by which the metal layer is deflected by the detonation pressure, the angle, $\lambda$, which depends upon the pattern of propagation of detonation and the detonation velocity, D, of the explosive. Thus in addition to the initial angle and the explosive loading (to which $\gamma_1$ and $\gamma_2$ are directly proportional), the method or location of the point or line of initiation and the detonation velocity of the explosive must be adjusted so that the relays $V_{C1}/C_1$ and/or $V_{C2}/C_2$ are less than 1.2.

In order to meet the second critical requirement for bonding the angle between the metal layers in the collision region must be controlled by a suitable adjustment of process conditions. When the entire explosive layer(s) is initiated simultaneously the angle, $\psi$, at which the metal layers collide is equal to the initial angle, $\delta$, between the layers and, obviously $\psi$ is increased by a corresponding increase in $\delta$. However, when the explosive layer is initiated at a point or along a line on the layer $\psi$ is a function of the collision velocities of the metal layers and of the relative plate velocity and the effect of adjustment of process conditions on $\psi$ depends upon the effects of these adjustments on $V_{C1}$, $V_{C2}$ and $V_P$ (see relation (28)).

Within the limitation that the initial angle between the metal layers, and the loading, detonation velocity, and method of initiation of the explosive layer(s) satisfy the two critical requirements for bonding many variations are possible.

It has been found that when the initial angle between the metal layers is between about 1° and 40° the process of the present invention can be carried out without extensive deformation of the bonded system. However, when the initial angle is 60° or more the bonded system often is severely deformed by the forces produced by detonation of the explosive layer or layers. This deformation can be attributed at least in part to the fact that when metal layers are arranged at large angles with respect to one another those portions of each layer which are furthest from the juncture between the layers must travel relatively large distances before colliding with corresponding portions of the other layer. Over such relatively large distances air between the layers may act as a "cushion" preventing stable acceleration of the layer or layers to the appropriate velocity for stable collision resulting in jetting. The layer or layers may "flap" or oscillate enroute to the collision region and this phenomenon as well as lagging edges caused by the boundary effects at free surfaces, i.e., edges of the layer or layers, contribute to the gross deformation and/or poor bonding observed when the initial angle between the metal layers is 60° or more. For the same reasons, although the metal layers need not actually meet but may be separated by a small distance at the point or line closest to the line of intersection of their lanes, this distance should be kept to a minimum and generally a separation of more than about 1 inch is neither necessary nor desirable.

The expression "explosive loading" as used herein relates to the weight distribution per unit area of the explosive layer or layers. However, a buffer layer of some material such as a polyester foam or film, Masonite, water, tape etc. can be interposed between an explosive layer and the adjacent metal layer in order to prevent surface contamination or roughening of the metal layer. Since such a buffer layer may tend to attenuate the pressure produced by detonation of a given explosive at a given weight distribution, use of such a buffer layer may effectively reduce the explosive loading. Conversely, increasing confinement of an explosive layer may effectively increase the explosive loading. One explosive loading often is satisfactory for a number of different bonding systems. As is shown in the examples, the amount of explosive used for bonding two stainless steel plates of identical size is approximately the same for the case when the initial angle between the metal layers is 5° and when the angle is 32°. The particular amount, or weight distribution, and loading of explosive suitable in any case will be readily apparent to one skilled in the art, considering such factors as type of explosive, thickness of the metal layer, etc. In any case, as explained above, the explosive loading must be sufficient to produce a collision pressure which exceeds the elastic limit of at least one of the metal layers. Obviously, excessive explosive may cause undesired deformation and should be avoided.

The explosive used must be a detonating explosive. Generally, the minimum detonation velocity of the explosive composition is at least about 1200 meters per second since below this velocity detonation is often unstable and the effect of the composition on the metal workpiece is often unpredictable. Generally the maximum detonation velocity is no more than about 9000 meters per second since the shock waves associated with explosive compositions having extremely high detonation velocities often cause spalling of one or more of the metal layers. The practical maximum detonation velocity for a given system will be obvious to one skilled in the art considering such factors as strength of the metal layers, etc. However if more than one explosive layer is used in a single operation the two layers should have at least approximately the same detonation velocity. Otherwise, the detonation front of the layer having the higher velocity may reach a point adjacent to an undetonated portion of the other layer and dislodge the undetonated portion from position. This effect, as well as anomalous effects due to interfering shock waves, is detrimental to formation of a continuously bonded, substantially undeformed composite. Although in some cases, the deleterious effects of explosive layers having different detonation velocities can be overcome, e.g., by simultaneous plane wave intiation of both layers or some other specially designed method of initiation, such a situation introduces unnecessary complications and is generally to be avoided.

The explosive layers may be initiated by any conventional initiating device, e.g., blasting cap, exploding wires, detonating cord, line wave generator, plane wave generator or any suitable combination thereof. The location of initiation on one or both layers may be at a point, e.g., at a point along an edge, a corner, or in the center of the layer, along a line such as an edge of the layer, or simultaneously over the entire surface of the layer. However, when more than one explosive layer is used, both layers generally should be initiated substantially simultaneously at substantially corresponding locations on the two layers so that the pattern of propagation of detonation of the two layers is essentially the same. Otherwise difficulties comparable to those mentioned above with reference to use of 2 layers of explosive having different detonation velocities may be encountered.

The process of the invention is particularly suitable for seam welding of metal sheets to form large flat, continuous surfaces or rectangular containers and for seam welding of pipes or tubes. In such operations where the length of the surfaces to be bonded is substantially greater than their width, the explosive layer(s) is conveniently initiated at a point on the layer so that $\lambda=0$ over a substantial portion of the layer, i.e., detonation proceeds along the length of the layer parallel to the juncture between the metal layers. This technique forces the air out from between the layers and insures a sound bond over the length of the seam.

The process of the invention is also particularly suitable for bonding thick metal layers, i.e., ½ inch thick or thicker. By employing a relatively large initial angle, $\delta$ between the layers and adjusting process conditions so that the jet escapes completely from between the layers a thin bond zone comprising essentially a direct metal-to-metal bond rather than a thick layer of solidified melt which may contain solidification or other defects can be obtained. Also, when a metal layer of relatively high density is propelled against a stationary metal layer of relatively low density, by employing a relatively large initial angle, $\delta$, and adjusting process conditions so that the jet oscillates, a sound bond is obtained.

The strength of the substantially continuous metallurgical bond formed by the process of the present invention generally is greater than that of the weaker of the metal layers in the composite. The ductility of the bonded composite generally is comparable to that of the unbonded metal layers and it may be improved by heat treatment. Thus, if desired the bonded metals may be subjected to further mteallurgical operations such as forming, drawing, extruding, rolling, etc.

The invention may be illustrated by the following. In each of the examples the character of the bond between the metal layers is determined by ultrasonic testing and by metallographic examination of photomicrographs of polished and etched portions of the cross-sections of the composites produced.

EXAMPLE 1

This bonding technique involves a single moving disk being driven against a stationary disk. The explosive employed is a thin, uniform sheet of a flexible explosive composition comprising 35% pentaerythritol tetranitrate, 50% red lead, and, as a binder, 15% of a 50/50 mixture of butyl rubber and a thermoplastic terpene resin [mixture of polymers of $\beta$-pinene of formula $(C_{10}H_6)_n$], commercially available as "Piccolyte" S–10 (manufactured by the Pennsylvania Industrial Chemical Corporation). This composition has a detonation velocity of about 5000 meters per second. Complete details of this composition and a suitable method for its manufacture are disclosed in U.S. Patent 3,093,521.

A type 321 stainless steel disk 5⅝ inches in diameter x 0.050 inch thick is placed on a supporting flat metal plate. A copper disk having the same dimensions as the steel disk is positioned in such a manner as to form an angle of 7°30′ between the inner surfaces of the plates, i.e., the surfaces facing one another when the plates rest against each other along a section of the perimeter. The angle is maintained by taping the contiguous edges of the disk and placing a spacer bar opposite the contiguous surfaces. The surfaces of the disks are not treated in any manner to remove surface impurities. A conforming layer, i.e., 5⅝-inch disk of the above-described explosive composition, is attached to the outer surface of the copper disk by tape. The weight distribution of the explosive layer is 2 grams per square inch. After initiation of the explosive layer by a No. 6 electric blasting cap at the point where the metal layers are in contact, it is found that substantially continuous metallurgical bonding over the entire area of the interface between the two disks is achieved.

The metal composite thus produced is successfully formed into a cuplike configuration without any apparent fracture or separation of the bond by positioning a layer of a detonating explosive on the metal composite and initiating the explosive to drive the composite against a cup-shaped steel mandrel.

TABLE I

| Metal Layer 1 | | | | Metal Layer 2 | | | Angle between metal layers, deg. | Explosive | |
|---|---|---|---|---|---|---|---|---|---|
| Example | Type | Size (in.) | Treatment of surface | Type | Size (in.) | Treatment of surface | | Size of each layer (in.) | Weight distribution (g./in.²) |
| 5 | 304 stainless steel. | 2¾ x 2¾ x 1/32 | None | 304 stainless steel. | 2¾ x 2¾ x 1/32 | None | 5 | 2¾ x 2¾ | 3 |
| 6 | do | 2¾ x 2¾ x 1/32 | do | do | 2¾ x 2¾ x 1/32 | do | 10 | 2¾ x 2¾ | 3 |
| 7 | do | 2¾ x 2¾ x 1/32 | do | do | 2¾ x 2¾ x 1/32 | do | 16 | 2¾ x 2¾ | 3 |
| 8 | do | 2¾ x 2¾ x 1/32 | do | do | 2¾ x 2¾ x 1/32 | do | 32 | 2¾ x 2¾ | 3 |
| 9 | do | 6 x 12 x 1/16 | do | Mild steel | 6 x 12 x 1/16 | do | 9 | 6 x 12 | 3 |
| 10 | do | 6 x 12 x 1/16 | do | do | 6 x 12 x 1/16 | do | 9 | 6 x 12 | 6 |
| 11 | do | 3 x 3 x ⅛ | do | do | 3 x 3 x ½ | Cleaned with emery cloth. | 12 | 3 x 3 | 6 |
| 12 | do | 3 x 3 x ⅛ | do | do | 3 x 3 x ½ | do | 2 | 3 x 3 | 6 |
| 13 | Mild steel | 6 x 6 x ¼ | Ground | Mild Steel | 6 x 6 x ¼ | Ground | 9 | 6 x 6 | 12 |
| 14 | do | 6 x 6 x ¼ | do | do | 6 x 6 x ½ | do | 15 | 6 x 6 | 12 |
| 15 | do | 1½ (diam.) x 1/16 | None | do | 1½ (diam.) x 1/16 | None | 27 | 1½ diam | 3 |
| 16 | 321 stainless steel. | 5⅝ (diam.) x 0.05 | do | 321 stainless steel. | 5⅝ (diam.) x 0.05 | do | 14 | 5⅝ diam | 3 |
| 17 | Titanium | 2¾ x 2¾ x 0.025 | do | 304 stainless steel. | 2¾ x 2¾ x 1/32 | do | 20 | 2¾ x 2¾ | 3 |
| 18 | Copper | 5⅝ (diam.) x 0.05 | do | 321 stainless steel. | 5⅝ (diam.) x 0.05 | do | 14 | 5⅝ diam | 2 |
| 19 | Titanium | 5⅝ (diam.) x 0.05 | Annealed | Aluminum | 5⅝ (diam.) x 0.10 | do | 14 | 5⅝ diam | 2 |
| 20 | Mild steel | 1½ (diam.) x 1/16 | None | Mild steel | 1½ (diam.) x 1/16 | None | 40 | 1½ diam | 3 |
| 21 | Nickel | 4 x 5 1/16 | do | Copper | 4 x 5 x 1/16 | do | 40 | 4 x 5 | 5 |
| 22 | do | 4 x 5 x 1/16 | do | do | 4 x 5 x 1/16 | do | 60 | 4 x 5 | 5 |

The following example illustrates the seaming of a metal sheet to form a pipe.

EXAMPLE 2

A 7-inch x 1/32-inch aluminum sheet is wrapped around a 2-inch-diameter steel mandrel so that there is a 1½-inch overlapping portion of aluminum sheet. A ⅛-inch space remains at the edge of the overlapping portion; the overlapping portion is in contact with the edge of the layer adjacent the mandrel. Thus the angle varies slightly but, in general, lies between 10 and 30°. The steel mandrel has a light coat of petrolatum to prevent the aluminum from bonding to the steel mandrel. A 7-inch x 1½-inch strip of explosive is placed along the edge of the entire length of the overlapping portion of the aluminum sheet. The explosive is a uniform sheet of an explosive composition comprising, by weight, 75% pentaerythritol tetranitrate, 7.5% paper pulp, and 17.5% of a low-temperature polymerized acrylonitrile-butadiene elastomer containing a high percentage (approximately 40%) of acrylonitrile and having a specific gravity of 1.00, and a Mooney viscosity of 70–95 (commercially available as "Hycar" 1041 and manufactured by the B. F. Goodrich Co.). The weight distribution of the composition is 2 grams per square inch. This explosive composition is described in U.S. Patent 3,102,833. After initiation of the explosive layer by an electric blasting cap positioned in the center of one of the 1½-inch edges of the layer, a firmly seamed pipe results wherein the seam comprises a substantially continuous metallurgical bond over the entire area of the interface between the overlapped ends of the aluminum sheet.

To illustrate seam welding of metal sheets to form flat continuous surfaces, the following examples are given.

EXAMPLE 3

An aluminum sheet, 6 inches x 2¼ inches x 1/16-inch, is placed on a steel support. A second 6 x 2¼ x 1/16-inch aluminum sheet having a 1-inch, slightly bent portion (7° angle) along the entire length is positioned in such a manner so that the fold of the bent portion is adjacent the entire length of the first sheet and the bent portion overlaps 1 inch of the first sheet, forming an angle of approximately 7° with the first sheet. A 1-inch x 6-inch strip of explosive is fastened to the outer surface of the bent portion, i.e., the bent portion is propelled in a direction toward the first sheet upon initiation of the explosive along the edge adjacent the fold. The explosive employed is a slightly modified version of that described in Example 1 and comprises a layer of a flexible explosive composition comprising 20% very fine pentaerythritol tetranitrate, 70% red lead, and, as a binder, a mixture of 8% of the binder described in Example 1 and 2% of polybutene having an average molecular weight of approximately 840, a specific gravity of 0.90–0.87, and a viscosity index of 108 (commercially available as Polybutene 24 and manufactured by Oronite Chemical Company). The detonation velocity of the explosive composition is 4000 meters per second and the weight distribution is 5 grams per square inch. After initiation of the explosive layer by an electric blasting cap positioned in the center of the 6-inch edge of the explosive which is adjacent to the bend in the second aluminum sheet, a firmly bonded one-inch seam comprising a substantially continuous metallurgical bond over the entire area of the interface between the overlapped ends of the two sheets, joins the two sheets.

EXAMPLE 4

The procedure of Example 3 is followed to seam two copper sheets, each 6 inches x 2 inches x 1/16 inch, except that the 1 inch x 6 inch strip of explosive used is a layer of a flexible composition comprising 72% pentaerythritol tetranitrate, 6.5% nitrocellulose, and 21.5% of tri(2-eth- per second. The explosive composition is the subject of U.S. Patent 2,992,087. The weight distribution of the explosive composition is 1.5 grams per square inch. After initiation of the explosive layer by an electric blasting cap, the two sheets are found to be firmly bonded by a one-inch seam comprising a substantially continuous metallurgical bond over the entire area of the interface between the overlapped ends of the two sheets.

Table I represents variations applicable in the angular bonding technique of the invention, e.g., angle range, types of metal, weight distribution of explosives, etc.

The explosive used in all of the examples given in Table I, except Examples 10, 11, 21, and 22 is that described in Example 1. In Examples 10 and 11, the explosive used is a slightly modified version of that described in Example 1 and comprises a flexible explosive composition comprising 20% very fine pentaerythritol tetranitrate, 70% red lead, and 10% of the binder described in Example 1. In Examples 21 and 22, the explosive used is that described in Example 3.

The bonding assemblies are similar to that shown in FIGURE 2 and in all of the examples, except Examples 5, 15, 20, 21 and 22, the explosive layers are initiated by a combination of a No. 6 electric blasting cap and detonating cords positioned as shown in FIGURE 2. In Example 5, the explosive layers are initiated by two line wave generators (such as described in U.S. Patent 2,943,-571, issued July 5, 1960), one of which is attached to that edge of each explosive layer adjacent to the juncture between the metal layers, which in turn are initiated simultaneously by an electric blasting cap. In Examples 15 and 20 the combination of electric blasting cap and detonating cords is used. However, in these examples a cord is attached to the center of each explosive layer rather than to an edge of the layer as shown in FIGURE 2. In Examples 21 and 22 the explosive layers are initiated by means of a strip of the explosive composition described in Example 4 which is positioned so that it is in contact with that edge of each explosive layer adjacent to the juncture between the metal layers over the entire length of that edge. The strip is in turn initiated by means of a line wave generator and an electric blasting cap as described in connection with Example 5.

In all of the examples the metal layers are found to be substantially continuously metallurgically bonded over the entire area of the interface between the metal layers after initiation of the explosive layers. When the shear strengths are determined according to A.S.T.M. Method No. A263–44T, the shear strengths of the bonded assemblies are found to be much higher than the minimum (20,000 p.s.i.) prescribed by A.S.T.M. specifications for this type of bonded assembly. For instance, the shear strengths of the bonded asemblies produced in Examples 11 and 12 are 54,100 and 60,400 p.s.i., respectively. Bonded assemblies produced by common conventional means usually exhibit a strength of only from 30,000 to 35,000 p.s.i.

Table II presents data relative to bonding more than 2 metal layers in a single operation.

In all of the examples given in Table II the bonding assemblies are arranged substantially as shown in FIGURE 2. However, a third metal layer or interleaf is interposed between metal layers 1 and 2. The explosive used in each of the examples is that described in Example 1 and the explosive layers are initiated as shown in FIGURE 2 and as described above in connection with Examples 6–14 and 16–19. After initiation of the explosive layers each of the outer metal layers is found to be substantially continuously metallurgically bonded to the interleaf over the entire area of the interface between the layer and the interleaf.

TABLE II

| Ex | Metal Layer 1 | | Interleaf | | Metal Layer 2 | | Angle between metal layer 1 and interleaf | Angle between metal layer 2 and interleaf | Explosive | |
|---|---|---|---|---|---|---|---|---|---|---|
| | Type | Size (in.) | Type | Size (in.) | Type | Size (in.) | | | Size of each layer (in.) | Weight distribution (g./in.²) |
| 23 | Titanium | 2 x 7 x 0.025 | 304 stainless steel | 2 x 7 x 1/32 | Titanium | 2 x 7 x .025 | 1° | 3° | 2 x 7 | 2 |
| 24 | do | 2 x 7 x 0.025 | do | 2 x 7 x 1/32 | do | 2 x 7 x .025 | 5° | 5° | 2 x 7 | 3 |
| 25 | do | 2 x 7 x 0.025 | do | 2 x 7 x 1/32 | do | 2 x 7 x .025 | 7° | 7° | 2 x 7 | 2 |
| 26 | do | 2¾ x 2¾ x 0.025 | do | 2¾ x 2¾ x 1/32 | do | 2¾ x 2¾ x 0.025 | 8° | 10° | 2¾ x 2¾ | 3 |
| 27 | Mild steel | 5⅝ (diam.) x 0.05. | 3-layer composite Cu/mild steel/Cu. | 5⅝ (diam.) x 0.05. | 321 stainless steel. | 5⅝ (diam.) x 0.05. | 7°30′ | 7°30′ | 5⅝ (diam.). | 2 |
| 28 | Copper | 5⅜ (diam.) x 0.05. | Mild steel | 5⅜ (diam.) x 0.062. | Copper | 5⅝ (diam.) x 0.05. | 7°30′ | 7°30′ | 5⅜ (diam.). | 2 |
| 29 | 304 stainless steel | 3 x 3 x 1/16 | Alloy: 72 silver/28 copper. | 3 x 3 x 0.004 | 304 stainless steel. | 3 x 3 x 1/16 | 5° | 5° | 3 x 3 | 3 |

EXAMPLE 30

A mild steel plate 6 inches wide, 9 inches long, and ¾ inch thick is placed on a plywood slab and a 304 stainless steel plate 6 inches wide, 9 inches long and ⅛ inch thick is supported above the mild steel plate by means of steel spacer bars spot welded to corresponding points on the adjacent edges of the two plates. The plates are positioned so that the minimum separation between them is 0.05 inch along the entire length of adjacent 6-inch edges of the plates, i.e., they substantially meet along a line and the angle between the plates is 10°. The external surface of the stainless steel plate is covered with a layer of polystyrene foam 1-inch thick which in turn is covered with a layer of the explosive composition described in Example 4 having a weight distribution of 5 grams per square inch. The explosive is initiated by means of an electric blasting cap positioned in the center of the explosive layer and after detonation the plates are substantially continuously metallurgically bonded over the entire area of the interface between them.

EXAMPLE 31

A substantially continuously metallurgically bonded system is prepared using the materials and technique described in Example 30. However in this example the layer of explosive is initiated by means of a plane wave generator as described in U.S. Patent 2,887,052 issued May 19, 1959.

EXAMPLE 32

A substantially continuously metallurgically bonded system is prepared using the materials and a modification of the technique described in Example 30. In this example the plates are positioned so that the minimum separation between them is 0.05 inch. However this minimum separation is between one corner of the stainless steel plate and the corresponding adjacent corner of the mild steel plate, i.e., they substantially meet at a single point, rather than along adjacent edges of the plates over the entire lengths of those edges as in Example 30. The angle between the plates in any plane perpendicular to the line of intersection of the planes of the two plates is 5° and the electric blasting cap is positioned at that corner of the explosive layer which is adjacent to the juncture between the plates.

The invention has been described fully in the foregoing and it is intended to be limited only by the following claims.

What is claimed is:

1. A metthod for forming a substantially continuous metallurgical bond between metal layers which comprises forming a juncture between at least two ductile metal layers, said juncture being defined by an angle of about 1 to 60°, positioning a layer of a detonating explosive on the external surface of at least one of the metal layers, and initiating the explosive so that at least one of the ratios of the collision velocities to the respective sonic velocities of the metal layer is less than 1.2 and when each of these ratios is greater than 1.0 the angle between each two adjacent metal layers in the collision region exceeds the maximum value of the sum of the deflections produced in the metal layers by oblique shock waves, the loading of said explosive being at least that which produces a collision pressure greater than 100% of the elastic limit of the metal having the lowest elastic limit in the system.

2. A method for forming a substantially continuous metallurgical bond between metal layers which comprises forming a juncture between two layers of different ductile metals, said juncture being defind by an angle of about 1 to 40°, positioning a layer of a detonating explosive on the external surface of at least one of the metal layers and initiating the explosive so that at least one of the ratios of the collision velocities to the respective sonic velocities of the metal layers is less than 1.2 and, when each of these ratios is greater than 1.0, the angle between said metal layers in the collision region exceeds the maximum value of the sum of the deflections produced in the metal layers by oblique shock waves, the loading of said explosive being at least that which produces a collision pressure greater than 100% of the elastic limit of the metal having the lowest elastic limit in the system.

3. A method as in claim 2 wherein a layer of a detonating explosive is positioned on the external surface of one metal layer.

4. A method as in claim 2 wherein a layer of a detonating explosive is positioned on the external surface of each of two metal layers, each of the layers of explosive having substantially the same detonation velocity, and the layers of explosive being initiated substantially simultaneously and at substantially corresponding locations on each of the layers of explosive.

5. A method as in claim 2 wherein the explosive is initiated at a point on an edge adjacent to the juncture between the metal layers.

6. A method as in claim 2 wherein the explosive is initiated simultaneously along an entire edge adjacent to the juncture between the metal layers.

7. A method as in claim 3 wherein the explosive is initiated at a point substantially contiguous to the center of gravity of said layer of a detonating explosive.

8. A method as in claim 4 wherein said locations comprise points substantially contiguous to the centers of gravity of said layers of explosive.

9. A method as in claim 3 wherein the explosive is initiated simultaneously over the entire surface of said layer of a detonating explosive.

10. A method as in claim 4 wherein each of said layers of explosive is initiated simultaneously over its entire surface.

11. A method as in claim 2 wherein said metal layers are positioned so that they substantially meet along an entire edge of each of the layers and the explosive is initiated along an edge of the bonding assembly perpendicular to said first edge.

12. A method as in claim [2] *1* wherein said metal layers comprise overlapping ends of a single metal layer.

13. A method as in claim 3 wherein at least one of said metal layers comprises a plurality of single layers bonded together.

14. A method of claim 2 wherein said angle is about from 1 to 32° and said ductile metal layers are selected from the group consisting of iron, titanium, niobium, tantalum, silver, nickel, magnesium, copper, zirconium and their alloys.

15. A process of claim 14 wherein said two layers are of titanium and steel respectively.

*16. A method of welding metal parts having surfaces to be joined comprising the steps of arranging said parts in such a manner as to form a V joint having an included angle greater than zero degrees, coating the outer surface of one of said parts with a layer of explosive, and detonating said explosive at the apex of said V joint whereby said facing surfaces are driven progressively into contact at high relative velocity and under a great pressure whereby bonding of the parts occurs.*

*17. A method of claim 16 wherein said V joint has an* included angle of about from *1* to *32°*.

References Cited

The following references, cited by the Examiner, are of record in the patented file of this patent or the original patent.

UNITED STATES PATENTS 3,137,937 6/1964 Cowan et al. _____ 29—487 X

OTHER REFERENCES

"Explosive Welding of Metals," Masters Thesis (U.C.L.A.) by Richard John Zabelka, title page, ii, 1, 18, 19 and 43. (Thesis available from Archivist's Office at U.C.L.A.).

PAUL M. COHEN, Primary Examiner

U.S. Cl. X.R.

29—421, 486, 497.5